United States Patent [19]

Cheresnowsky et al.

[11] Patent Number: 4,814,148

[45] Date of Patent: Mar. 21, 1989

[54] METHOD FOR REMOVING ARSENIC FROM AMMONIUM DIMOLYBDATE

[75] Inventors: Michael J. Cheresnowsky, Towanda; Judy L. Scheftic, South Waverly, both of Pa.

[73] Assignee: GTE Products Corporation, Stamford, Conn.

[21] Appl. No.: 177,224

[22] Filed: Apr. 4, 1988

[51] Int. Cl.$^4$ .............................................. C01G 39/00
[52] U.S. Cl. .......................................... 423/55; 423/87
[58] Field of Search ............................ 423/55, 87, 593

[56] References Cited

U.S. PATENT DOCUMENTS

| | | | |
|---|---|---|---|
| 3,829,550 | 8/1974 | Ronzio et al. | 423/55 |
| 4,457,776 | 7/1984 | Van't Sant et al. | 423/87 |
| 4,702,895 | 10/1987 | Cheresnowsky et al. | 423/55 |
| 4,741,886 | 5/1988 | Vanderpool et al. | 423/55 |

FOREIGN PATENT DOCUMENTS

| | | | |
|---|---|---|---|
| 108732 | 5/1987 | Japan | 423/55 |
| 454178 | 2/1975 | U.S.S.R. | 423/55 |

*Primary Examiner*—John Doll
*Assistant Examiner*—Wayne A. Langel
*Attorney, Agent, or Firm*—Donald R. Castle; L. Rita Quatrini

[57] ABSTRACT

A method is disclosed for purifying ammonium dimolybdate which comprises dissolving ammonium dimolybdate containing arsenic as an impurity in water to form an ammonium molybdate solution and insolubles containing essentially all of the arsenic, filtering off the insolubles from the solution, adjusting the pH of the solution to at least about 9.0 and then crystallizing pure ammonium dimolybdate from the solution wherein the arsenic content is less than about 8 weight ppm.

3 Claims, No Drawings

METHOD FOR REMOVING ARSENIC FROM AMMONIUM DIMOLYBDATE

This invention relates to a method for removing arsenic from ammonium dimolybdate by dissolving impure ammonium dimolybdate in water by removing the insoluble arsenic impurities to obtain a purified ammonium molybdate solution and thereafter crystallizing pure ammonium dimolybdate from the solution.

BACKGROUND OF THE INVENTION

Arsenic is a troublesome impurity found in technical grade molybdenum trioxide. It is usually separated from molybdenum by precipitation as magnesium ammonium arsenate from an ammoniacal ammonium molybdate solution and filtration from the solution. Quantitative separation is critical because arsenic must be <8 weight ppm in ammonium dimolybdate. When ammonium dimolybdate (which is obtained by evaporative crystallization from an ammoniacal ammonium molybdate solution) contains arsenic levels higher than 8 weight ppm it must be reprocessed to purify it of arsenic.

Prior methods of purifying ammonium dimolybdate (ADM) of arsenic involve dissolving the ADM in ammonia, and adding magnesium ions to form magnesium ammonium arsenate, which is filtered off. The purified solution is then passed through an ion exchange resin to remove the Mg ions from the molybdate solution. The solution is then evaporated to crystallize ADM. The arsenic is not consistently reduced when these methods are followed. These methods require use of ammonia, and excess magnesium. Therefore, there is an extra step to purify the solution of magnesium. If an ion exchange column is used, it must be regenerated more often because it becomes loaded more quickly because of the added Mg ions.

U.S. Pats. Nos. 3,829,550, 3,848,049, 4,273,745, 4,278,644, 4,298,582, 4,320,094, 4,525,331, 4,555,386, 4,596,701, 4,601,890, 4,604,267, and 4,604,266 relate to various methods and processes to purify molybdenum.

SUMMARY OF THE INVENTION

In accordance with one aspect of this invention, there is provided a method for purifying ammonium dimolybdate which comprises dissolving ammonium dimolybdate containing arsenic as an impurity in water to form an ammonium molybdate solution and insolubles containing essentially all of the arsenic, filtering off the insolubles from the solution, adjusting the pH of the solution to at least about 9.0 and then crystallizing pure ammonium dimolybdate from the solution wherein the arsenic content is less than about 8 weight ppm.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention provides a method for purifying ammonium dimolybdate of arsenic. Moreover, the removal of arsenic from ammonium dimolybdate is quantitative. This is accomplished without use of ammonia or magnesium ions as has been the prior practice. Furthermore, if other impurities such as calcium and/or magnesium are present as contaminants, they can be removed by cation exchange techniques.

The ammonium dimolybdate to be purified generally contains about from about 8 to about 50 weight parts per million (ppm). Usually the ammonium dimolybdate has been derived through processing of molybdenum trioxide by dissolving the molybdenum trioxide in ammonia. This solution is subjected to known methods of purification to remove various impurities. The arsenic is usually reduced to less than about 8 weight ppm. However, sometimes the purification methods are not consistent and there remain higher levels of arsenic. The method of of this invention is most typically practiced on this ammonium dimolybdate. It is desirable that the arsenic level in ammonium dimolybdate be less than about 8 weight ppm. The reason for this is that molybdenum metal which is produced from ammonium dimolybdate in which the arsenic level is higher than about 8 ppm has inferior properties such as embrittling the Mo which reduces workability which makes it difficult to produce high quality material.

Ammonium dimolybdate containing arsenic as an impurity is dissolved in water to form a solution of ammonium molybdate. Upon dissolution of the ammonium dimolybdate in water, the arsenic compounds which are present do not dissolve and therefore remain as insolubles. It is desirable that the concentration of Mo in solution be high enough to make the process economically feasible. Preferably the concentration of molybdenum in the solution is from about 350 g ADM/l to about 420 g ADM/l.

The insolubles are filtered off from the ammonium molybdate solution. Since the insolubles can be flocculent it is preferred to add a filtration aid to the solution prior to the filtration. This results in an increase in the rate of filtration and a cleaner separation of the insolubles from the solution resulting in a minimum loss of molybdenum through entrainment in the insolubles. The filtration aids are usually the type that either physically entrap the insolubles or the type that coagulate the insolubles and thereby render them easier to filter through conventional filtration equipment. One suitable filtration aid of the first type is supplied by James River Corporation under the name of "Solka Floc". One suitable filtration aid of the second type is supplied by Dow Chemical Corporation of Midland Michigan under the name of "Separan".

Removal of the insolubles results in a solution which is essentially free of arsenic.

Ammonia is added to the resulting arsenic-free solution to a pH of greater than about 9.0, and preferably from about 9.0 to about 10.0. This is done because ammonium dimolybdate which is crystallized from solutions at these pH ranges has a larger crystal size than at lower pH's. This enables the ADM crystals to be filtered off more easily than if the pH is not adjusted in which case the crystals would be very fine and difficult to filter off.

Prior to crystallizing the ammonium dimolybdate from solution, the solution can be purified if necessary of impurities such as calcium and/or magnesium which can be present as contaminants through water, filtration aids, equipment, etc. This can be done by passing the solution through a chelating cation exchange resin to exchange the calcium and/or magnesium for the cation, preferably $NH_4+$.

Ammonium dimolybdate is then crystallized from the purified solution by evaporation. The resulting ammonium dimolybdate, ADM, contains less than about 8 weight ppm of As.

To more fully illustrate this invention, the following nonlimiting examples are presented.

Example 1

About 280 grams of ADM containing about 36 weight ppm of As are stirred with about 700 ml of water at room temperature for about 4 hours. The ADM dissolves but the solution is cloudy. Filtration through a commercial filter paper is slow but the filtration rate increases when a filtration aid such as Solka Floc is used. The filtered solution is clear. Ammonium hydroxide is added to the filtered solution to increase the pH to about 9.0. The solution is evaporated to obtain ADM crystals which are pure white and easily filtered. The ADM contains <8 ppm As.

For comparison, the same starting ADM is treated by a prior method involving adding Mg ions in the amounts of 0.01, 0.02, and 0.04 moles/l in three tests to precipitate arsenic. The "purified" ADM contains 31, 22, and 21 weight ppm of As respectively. This clearly shows that the method of the present invention is superior to the prior methods for removing arsenic.

Example 2

About 2150 kg of ADM having an arsenic content of about 23 weight ppm and 1365 gallons of water are charged into a tank and agitated for about 4 hours. Solka Floc is added to the tank and a filter press is coated with it. The solution is filtered through the coated filter press. The pH of the filtered solution is adjusted to about 9.7 with ammonium hydroxide and the solution is then passed through a chelating cation exchange column to remove contaminating divalent cations. The molybdenum is then crystallized from solution as ADM which contains <8 weight ppm As. The arsenic level is probably much lower than 8 ppm, however, 8 ppm is the detection limit of the spectrographic method of analysis which is routinely used on the ADM samples.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for purifying ammonium dimolybdate, said method comprising:
    (a) dissolving ammonium dimolybdate containing arsenic as an impurity in water to form an ammonium molybdate solution and insolubles containing essentially all of said arsenic;
    (b) filtering off said insolubles from said ammonium molybdate solution;
    (c) adjusting the pH of said ammonium molybdate solution to at least about 9;
    (d) crystallizing pure ammonium dimolybdate from said solution to wherein the arsenic concentration in said purified ammonium dimolybdate is less than about 8 weight parts per million.

2. A method of claim 1 wherein said pH is from about 9.0 to about 10.0.

3. A method of claim 1 wherein a filtration aid is added to said ammonium molybdate solution prior to filtering off said insolubles.

* * * * *